(12) United States Patent
Almberg et al.

(10) Patent No.: US 10,029,863 B2
(45) Date of Patent: Jul. 24, 2018

(54) ELECTRIC TURNOUT UNIT FOR AUTOMATIC CONVEYING APPARATUS

(71) Applicant: EWAB International AG, Lucerne (SE)

(72) Inventors: Patrik Almberg, Motala (SE); Roland Lundin, Vadstena (SE); Anders Axman, Vadstena (SE)

(73) Assignee: EWAB ENGINEERING AB, Vadstena (SE)

(*) Notice: Subject to any disclaimer, the term of this patent is extended or adjusted under 35 U.S.C. 154(b) by 0 days.

(21) Appl. No.: 15/212,502

(22) Filed: Jul. 18, 2016

(65) Prior Publication Data
US 2017/0015508 A1   Jan. 19, 2017

(30) Foreign Application Priority Data
Jul. 16, 2015 (DE) .......................... 10 2015 111 577

(51) Int. Cl.
*B65G 37/00* (2006.01)
*B65G 47/76* (2006.01)
(Continued)

(52) U.S. Cl.
CPC ....... *B65G 47/766* (2013.01); *B65G 21/2072* (2013.01); *B65G 43/00* (2013.01);
(Continued)

(58) Field of Classification Search
CPC .................................................. B65G 47/766
(Continued)

(56) References Cited

U.S. PATENT DOCUMENTS 3,006,457 A * 10/1961 Weiss ................... B65G 47/766
                                                            198/367
4,173,274 A * 11/1979 Kantarian ............ B65G 47/766
                                                            198/367
(Continued)

FOREIGN PATENT DOCUMENTS

DE   20 2014 000 310 U1   4/2014
EP      0 509 254 A1      3/1992
(Continued)

OTHER PUBLICATIONS

European Search Report in co-pending, related EP Application No. 16178962.3, dated Dec. 22, 2016.
(Continued)

*Primary Examiner* — William R Harp
(74) *Attorney, Agent, or Firm* — Thomas | Horstemeyer, LLP

(57) ABSTRACT

An electric turnout unit (1) serves for determining and changing the conveying path of object holders being moved by and together with a conveying means (28) of a conveying apparatus (29). The electric turnout unit (1) includes a pivot angle definition element (15) being rotatably supported and one sensor (6) or a plurality of sensors (6) for determining a first pivot position (35) and a second pivot position (36) of the pivot angle definition element (15). The first pivot position (35) and the second pivot position (36) differ by a first pivot angle difference (37) being greater than zero. The pivot angle definition element (15) includes a first detection point (17) being associated with the first pivot position (35) and a second detection point (17) being associated with the second pivot position (36).

13 Claims, 15 Drawing Sheets

(51) Int. Cl.
*B65G 43/00* (2006.01)
*B65G 21/20* (2006.01)

(52) U.S. Cl.
CPC .. *B65G 2203/043* (2013.01); *B65G 2203/044* (2013.01); *B65G 2811/0647* (2013.01)

(58) Field of Classification Search
USPC ........................................................ 198/367
See application file for complete search history.

(56) References Cited

U.S. PATENT DOCUMENTS

| | | | |
|---|---|---|---|
| 4,785,942 A | * | 11/1988 | Van Leijenhorst ..... B07C 3/065 198/367 |
| 5,452,786 A | | 9/1995 | Gilmore |
| 7,265,512 B2 | | 9/2007 | McMillan et al. |
| 7,963,385 B2 | * | 6/2011 | Sng ...................... B65G 47/766 198/367.1 |
| 2006/0144764 A1 | | 7/2006 | Large et al. |
| 2010/0032261 A1 | | 2/2010 | Sng et al. |
| 2011/0220458 A1 | | 9/2011 | Sng et al. |

FOREIGN PATENT DOCUMENTS

| | | |
|---|---|---|
| EP | 2 778 102 B1 | 3/2013 |
| JP | 01250190 | 5/1989 |
| WO | WO2004094279 A1 | 11/2004 |

OTHER PUBLICATIONS

German Office Action dated Oct. 25, 2017 in co-pending DE 10 2015 111 577.8.

* cited by examiner

ELECTRIC TURNOUT UNIT FOR AUTOMATIC CONVEYING APPARATUS

CROSS REFERENCE TO RELATED APPLICATIONS

The present invention claims priority to German Patent Application No. DE 10 2015 111 577.8, filed Jul. 16, 2015, and entitled "Elektrische Weicheneinrichtung für automatische Förder-vorrichtungen".

FIELD OF THE INVENTION

The invention relates to a turnout unit for determining and changing the conveying path of object holders being moved by and together with a conveying means of a conveying apparatus.

Such turnout units are especially used in automatic conveying apparatus serving to convey workpieces being supported on object holders between machining stations. For this purpose, the conveying apparatus includes a conveying means being especially designed as a continuously driven conveying chain being guided in a profile rail. The object holders are moved by and together with the conveying chain by friction without positively engaging the conveying chain. The object holder is stopped at the respective machining station by a stopping apparatus protruding into the conveying path in its stop position. The conveying chain is continuously moved during this.

To deliver the object holder to a different machining station, such conveying apparatus include junctions at which a turnout unit is arranged. Depending on the position of the turnout unit, the conveying path of the object holders is either maintained or changed.

BACKGROUND OF THE INVENTION

Pneumatic turnout units for determining and changing the conveying path of object holders are generally known in the prior art.

An electric turnout unit for determining and changing the conveying path of object holders is known from German utility model No. DE 20 2014 000 310 U1 corresponding to European patent No. EP 2 778 102 B1.

A turnout unit of a baggage transporting belt is known from US patent application No. US 2011/0220458 A1 The turnout unit includes an activation plate and sensors being associated therewith. During its rotation in the clockwise direction, the activation plate passes different sensors being designed as pairs of sensors. The first pair of sensors serves to reduce the rotational velocity of the activation plate. The second pair of sensors serves to cause the activation plate and thus the pivot arm to stop.

SUMMARY OF THE INVENTION

The invention relates to an electric turnout unit for determining and changing the conveying path of object holders being moved by and together with a conveying means of a conveying apparatus. The electric turnout unit includes a pivot angle definition element being rotatably supported and one sensor or a plurality of sensors for determining a first pivot position and a second pivot position of the pivot angle definition element. The first pivot position and the second pivot position differ by a first pivot angle difference being greater than zero.

With the novel electric turnout unit for determining and changing the conveying path of object holders, it is possible to reliably regain the desired turnout end position even after operational interruptions in a simple way.

The new pivot unit thus does not include a pneumatic drive, but instead an electric drive. Especially, this drive may be a stepped motor. Such a stepped motor is especially suitable for reaching a defined position. Furthermore, a stepped motor is especially powerful such that the required forces and torques, respectively, can be easily applied. However, it is also possible to use a different suitable electric motor.

The new pivot angle definition element cooperates with the one sensor or the plurality of sensors in a special way to finally attain the desired turnout end positions of the turnout unit. These turnout end positions correspond to the different conveying paths being prescribed by the turnout unit. In many cases, these are two different conveying paths. However, it is also possible that the turnout unit prescribes three or more conveying paths or that one of the conveying paths is a buffer position or a different non-conveying position.

The design and arrangement of the pivot angle definition element in combination with the arrangement of the one sensor or of the plurality of sensors thus determines the two pivot positions of the pivot angle definition element and thus the first pivot angle difference between these pivot positions.

The electric turnout unit may include a shaft being fixedly connected to the pivot angle definition element to be commonly rotated therewith. The shaft has a third pivot position being associated with a first conveying path of the object holders and a fourth pivot position being associated with a second conveying path of the object holders. The third pivot position and the fourth pivot position differ by a second pivot angle difference being greater than zero. The shaft is fixedly connected to a turnout arm—especially by a flange—to be commonly rotated therewith. The turnout arm is the component of the turnout unit which protrudes into the conveying path and which defines the conveying path for the object holders. The third pivot position and the fourth pivot position thus directly correspond to the two end positions of the turnout unit.

The first pivot position of the pivot angle definition element may be associated with the third pivot position of the shaft, and the second pivot position of the pivot angle definition element may be associated with the fourth pivot position of the shaft. This association may mean—but does not have to mean—that the pivot positions are identical. Thus, the pivot positions may differ from one another. This deviation may be especially chosen such that the second pivot angle difference is greater than the first pivot angle difference.

The second pivot angle difference may be greater than the first pivot angle difference. For example, it may be between approximately 2° and 20°, especially between approximately 6° and 10°, greater.

The first pivot angle difference may be defined by the outer shape of the pivot angle definition element. The outer shape of the pivot angle definition element being rotatingly driven by the electric motor leads to the effect that a sensor signal is produced. This sensor signal indicates that the respective end point of the pivot movement of the pivot angle definition element has been reached. Depending on this, the rotational movement of the electric motor is stopped. This stopping may either occur directly or after a specific delay. In case of the above-described greater second pivot angle difference, the rotational movement of the electric motor and thus of the shaft of the electric turnout unit is further continued after having reached the end point of the rotational movement of the pivot angle definition element. In case of a stepped motor, a defined number of additional steps is taken afterwards.

The pivot angle definition element includes a first detection point being associated with the first pivot position and a second detection point being associated with the second pivot position. The detection points are sensed by the on sensor or the plurality of sensors, and in this way, it is determined that the desired pivot position has been reached.

The first detection point and the second detection point may be end points of a common partial circular arc. The one sensor or the plurality of sensors is then especially arranged such that the material of the pivot angle definition element existing in the region of the partial circular arc is located in the sensed region of the one sensor or of the plurality of sensors. The remainder of the pivot angle definition element outside of the partial circular arc is arranged outside of the range of the one sensor or of the plurality of sensors.

The length of the partial circular arc may define the value of the first pivot angle difference. In this connection, the length is to be understood as the extension of the pivot angle definition element along the partial circular arc. Depending on the arrangement of the one sensor or of the plurality of sensors and the design and arrangement of the partial circular arc, an increase of the length of the partial circular arc either leads to a respective increase or a respective decrease of the first pivot angle difference. For example, if the partial circular arc is shortened by 10°, the first pivot angle difference is also increased and decreased, respectively, by 10°.

The electric turnout unit may include exactly one sensor detecting both detection points. The design may be especially chosen such that both detection points are designed as endpoints of a common partial circular arc having a radius being increased compared to the remainder of the pivot angle definition element. Thus, the detection portion being formed between the detection points is designed as a protruding portion of the pivot angle definition element. A respective sensor signal is produced when one of the detection points is reached. If it is then desired to attain the other position of the pivot angle definition element, the sense of rotation of the stepped motor has to be reversed. For this purpose, especially the last-used sense or rotation is stored in the control software and in a suitable storage medium of the electric turnout unit or of a different component, respectively.

However, the electric turnout unit may instead include exactly two sensors. The first sensor is then associated with the first detection point, and the second sensor is associated with the second detection point. In this way, there is no necessity of storing the last-used sense of rotation of the stepped motor. The last sense of rotation of the stepped motor necessarily results from the fact which one of the sensors emits a signal.

The one sensor or the plurality of sensors may be designed as a light barrier, a photoelectric sensor or an inductive sensor. With such sensors, it can be exactly determined if the respective pivot position of the pivot angle definition element has been reached.

The one sensor or the plurality of sensors may be designed as a sensor including a break contact. This means that the sensor signal is present in the non-activated condition of the sensor, i.e. the contact is closed. The sensor signal is cancelled during detection, i.e. the contact is opened. For example, if the sensor is designed as a light barrier, no element protrudes into the light beam in the non-active condition. The light beam is thus not interrupted and the sensor signal is present. At the ending of the rotational movement of the pivot angle definition element, the respective detection point enters the region of the light beam and interrupts the light beam. The respective signal is no longer present.

However, an element may protrude into the light beam in the non-active condition of the sensor. The light beam is interrupted and the sensor signal is present. At the ending of the rotational movement of the pivot angle definition element, the respective detection point exits the region of the light beam. The respective sensor signal is no longer present.

However, the one sensor or the plurality of sensors may also be designed as a sensor including a closing contact. In this case, there is the opposite signal constellation compared to a break contact. For example, if the sensor is again designed as a light barrier, no element protrudes into the light beam in the non-active condition. The light beam is thus not interrupted, but the sensor signal is not present. At the ending of the rotational movement of the pivot angle definition element, the respective detection point enters the region of the light beam and interrupts it. The respective sensor signal is now present.

However, it is also possible that an element protrudes into the light beam in the non-active condition of the sensor. The light beam is interrupted, but the sensor signal is no longer present. At the ending of the rotational movement of the pivot angle definition element, the respective detection point exits the region of the light beam. The respective sensor signal is present.

For setting up the turnout unit for a different first pivot angle difference, the pivot angle definition element may be replaceable by a different pivot angle definition element having a different outer shape. This different outer shape then defines a pivot angle difference having a different value and/or different end points of the pivotal movement. In this way, by replacing a very simple component of the electric turnout unit—namely the pivot angle definition element—it is possible to set up and change, respectively, the turnout unit for other assembly situations. Examples of different pivot angle differences are 19°, 27° and 35°.

For setting up the turnout unit for a different first pivot angle difference, it is also possible to design the position of the sensors in the turnout unit to be adjustable with respect to the pivot angle definition element. Different end points of the pivotal movement of the pivot angle definition element and thus a different first pivot angle difference result from a displacement of the sensors. In this way, without having to replace a component, it is possible to set up and change, respectively, the turnout unit for a different assembly situation.

The electric turnout unit may include a housing. The housing protects the mechanical and electrical components of the turnout unit being located in the housing reliably from dirt. Especially, the housing may comply with the requirements of protection class IP54. In this way, it is ensured that the turnout unit operates error-free during usual operation conditions.

The sensors are thus arranged in the housing of the electric turnout unit and not in the region of the turnout arms of the turnout unit. The sensors do not detect the finally resulting position of the turnout unit (which is decisive for the result), but instead an inner component of the turnout unit—namely the pivot angle definition element.

The turnout unit may include a separate control unit. The control unit may be connectable to a programmable logic controller (PLC) for sending and receiving electric signals.

The pivot angle definition element may be especially designed as a plate-shaped element being mounted at another component of the electric turnout unit. For example, this other component may be a part of the transmission of the electric turnout unit.

The function-determining portions of the plate-shaped pivot angle definition element are especially designed to be rotationally symmetrical. These function-determining portions are the detection portions being detected by the one sensor or the plurality of sensors. Non-function-determining portions of the pivot angle definition element may also be designed to be rotationally symmetrical. However, for material saving or for creating space, they may also be designed not to be rotationally symmetrical.

The electric turnout unit may include an electric stepped motor for producing the pivotal movement of the shaft and of the pivot angle definition element. The electric drive may be connected to a transmission also being part of the electric turnout unit. The stepped motor is switched off depending on the sensor signals of the one sensor or of the plurality of sensors. The stepped motor is especially also arranged in the housing of the electric turnout unit. The output shaft of the stepped motor is especially connected to the shaft of the electric turnout unit by the transmission. The pivot angle definition element is especially fixedly connected to a part of the transmission of the electric turnout unit.

The invention also elates to a method of teaching an electric turnout unit, especially a turnout unit including some or all of the above-described features. The method includes the following steps:

pivoting a turnout arm of the turnout unit in the direction of a desired turnout end position by an electric drive, detecting that a pivot angle definition element of the turnout unit has reached a defined pivot position by a sensor under emission of a signal to a control unit, continued pivoting of the turnout arm in the direction of the desired turnout end position for a defined period of time or a defined path, pivoting the turnout arm in the opposite direction until the pivot position of the pivot angle definition element has been reached again, while during this the traveled path is determined and stored as a calibrating path.

In the next step, especially the turnout arm is again pivoted in the direction of the desired turnout end position by the determined calibrating path such that the desired turnout end position is reached. However, this step is functionally rather not a part of the teaching process, but instead of the productive process.

Further method steps and additional details are specified in the description of the drawings.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as ell as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

BRIEF DESCRIPTION OF THE DRAWINGS

In the following, the invention is further explained and described with respect to preferred exemplary embodiments illustrated in the drawings.

DETAILED DESCRIPTION

Figure 1:
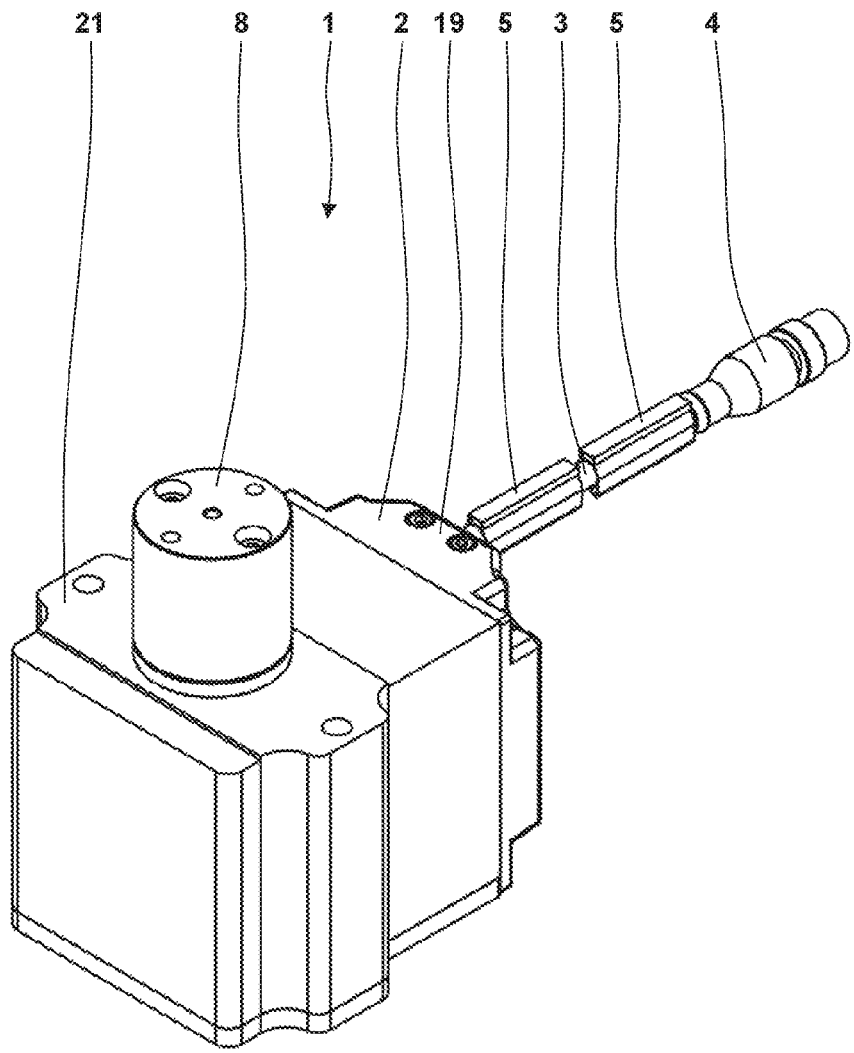
FIG. 1 illustrates a perspective view of an exemplary embodiment of the new electric turnout unit.
Figure 2:
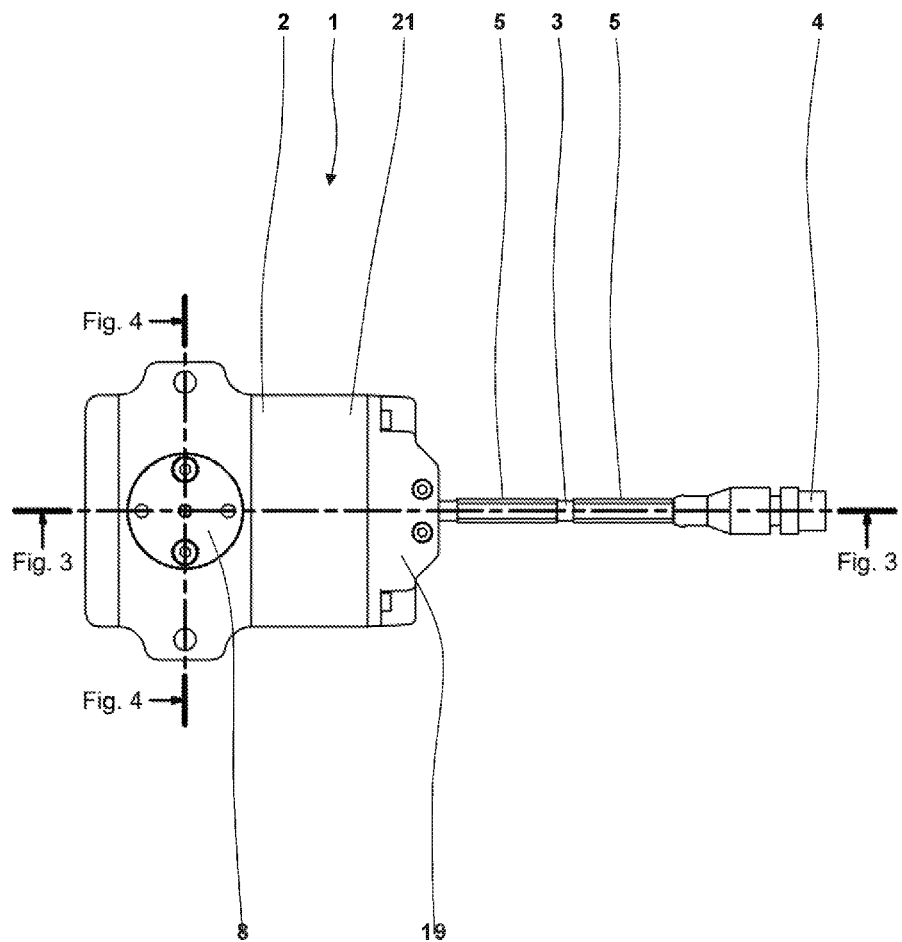
FIG. 2 illustrates a view from above of the turnout unit according to FIG. 1.
Figure 3:
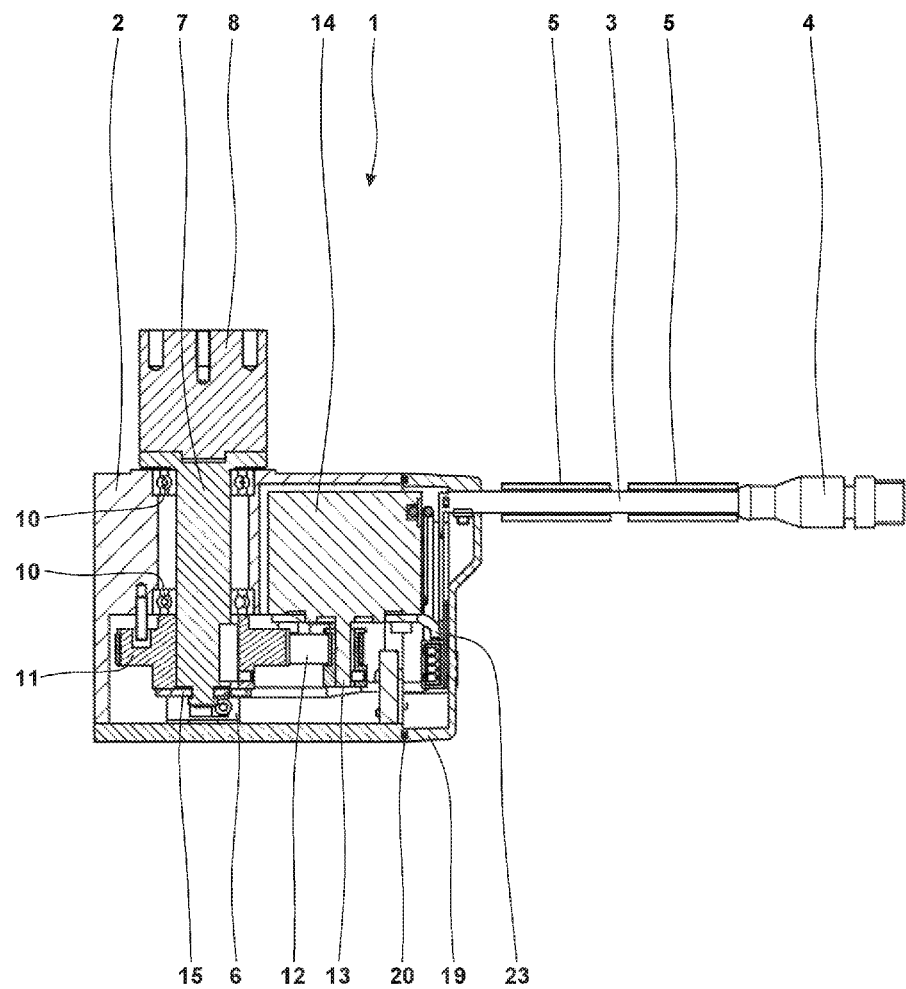
FIG. 3 illustrates a sectional view of the electric turnout unit according to line FIG. 3-FIG. 3 in FIG. 2.
Figure 4:
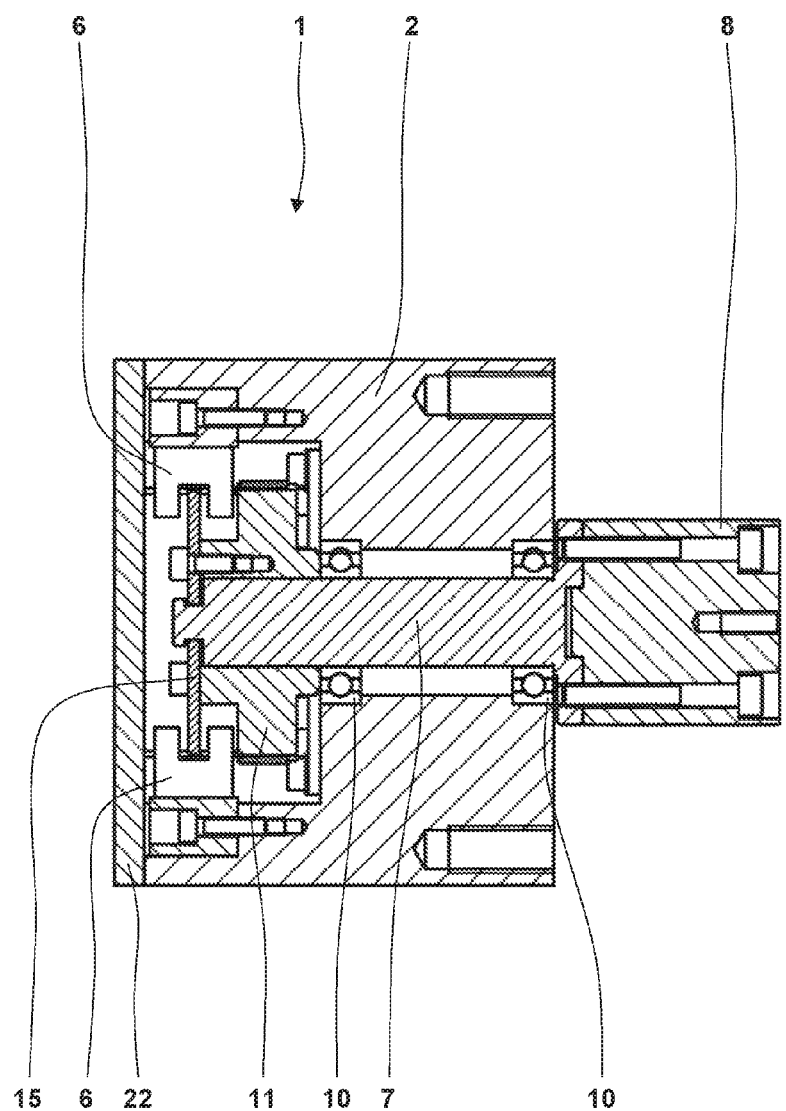
FIG. 4 illustrates a sectional view of the electric turnout unit according to line FIG. 4-FIG. 4 in FIG. 2.
Figure 5:
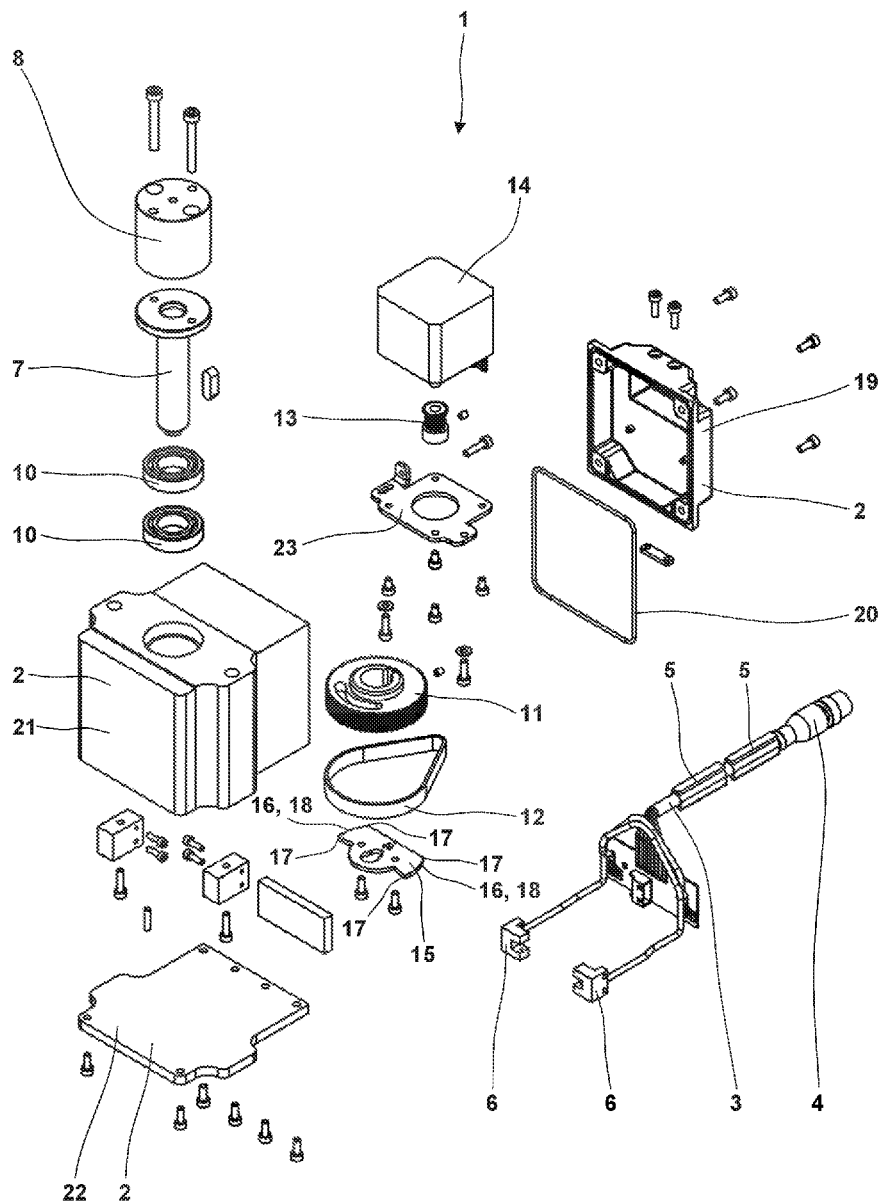
FIG. 5 illustrates the turnout unit in an exploded view.

Referring now in greater detail to the drawings. FIGS. 1-5 illustrate different views of an exemplary embodiment of a new electric turnout unit 1. The turnout unit 1 serves to determine and change the conveying path of object holders being moved by and together with a conveying means of a conveying apparatus.

The electric turnout unit one includes a housing 2 in which at least some of the components of the turnout unit 1 are arranged.

An electric line 3 leads out the housing 2. A connecting plug 4 is arranged at the end of the line 3. In this case, two label holders 5 are arranged at the electric line 3 before the connecting plug 4. The label holders 5 especially serve to label the turnout unit 1 to indicate its characteristics.

The electric line 3 includes a number of different wires having different functions. Among others, the sensor 6 are connected to the electric line 3. In the present case, the sensors 6 are light barriers. However, it is also possible to use other suitable sensors 6.

Furthermore, a shaft 7 leads out the housing 2. Outside of the housing 2, a flange 8 is connected to the shaft 7. The turnout arm 9 (see FIG. 7) not being illustrated in FIGS. 1-5 is connected to the flange 8. The turnout arm 9 is the element of the turnout unit 1 which provides the desired influence on the conveying path of the conveyed objects. The shaft 7 is rotatably supported in the housing 2 by bearings 10.

In the region of the other end of the shaft 7, a gear wheel 11 is fixedly connected to the shaft 7 to be commonly rotated therewith. A toothed belt 12 is mounted on the gear wheel 11, the toothed belt 12 connecting the gear wheel 11 with the toothed output shaft 13 of an electric motor 14. In this case, the electric motor 14 is designed as a stepped motor. However, it could also be designed as a different suitable electric motor. In this way, a transmission is formed, the transmission serving to transmit a rotational movement of the output shaft 13 of the electric motor 14 to the turnout arm 9 via the toothed belt 12, the gear wheel 11, the shaft 7 and the flange 8.

The electric motor 14 is also connected to the electric line 3, and it receives its power supply as well as functional commands thereby.

The housing 2 e.g. includes a housing cover 19 being connected to the housing base body 21 by screw connections and a seal 20. The housing 2 furthermore includes a housing plate 22. The electric motor 14 is connected in the housing 2 by a fixing plate 23.

A pivot angle definition element 15 is arranged in the region of the end of the shaft 7 in the housing 2. The pivot angle definition element 15 is fixedly connected to the shaft 7 to be commonly rotated therewith. The pivot angle definition element 15 is designed as a plate-shaped element, and it includes a plurality of fixing openings.

The outer shape of the pivot angle definition element 15 determines its functionality. In the present example, the pivot angle definition element 15 includes two partial circular arcs 16. Detection points 17 and detection regions 18 are formed by the respective ends of the partial circular arcs 16. Depending on the position of the shaft 7 and thus of the respective detection region 18 of the pivot angle definition element 15, this detection region 18 protrudes into the detecting region of the sensors 6 such that a sensor signal is produced. In case of the sensors 6 being designed as light barriers, this means that the light beam is interrupted. In this way, the position of the pivot angle definition element 15, and thus indirectly of the turnout arm 9, is detected by the sensors 6. The purpose of this detection and how it is configured will be further explained hereinbelow.

Figure 6:
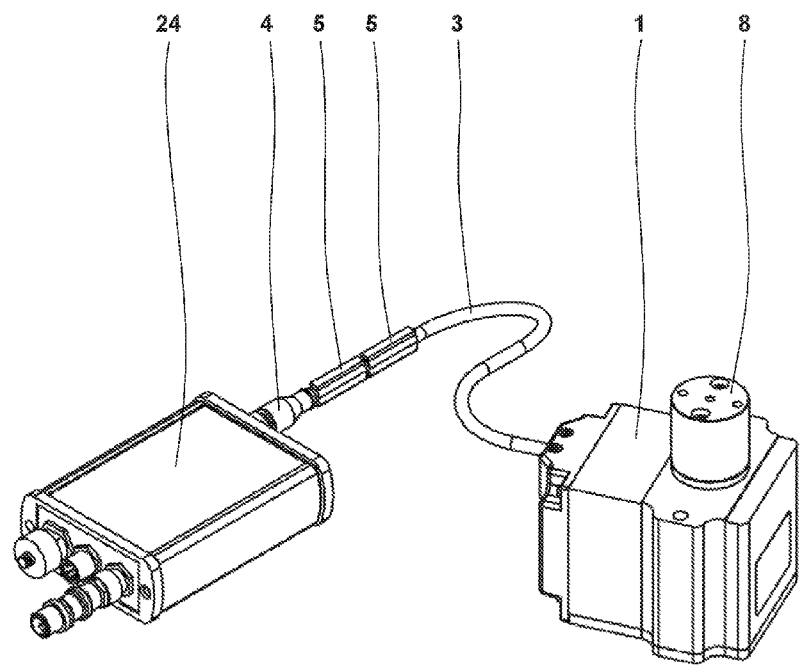
FIG. 6 illustrates a perspective vie of the turnout unit including a connected separate control unit.

A perspective view of the turnout unit 1 is illustrated in FIG. 6. In this case, a separate control unit 24 is connected to the turnout unit 1 via the plug 4 and the electric line 3.

In addition to the connecting socket being connected to the connecting plug 4, the control unit 24 includes connections by which it is connectable to a programmable logic controller (PLC; not illustrated).

Figure 7:
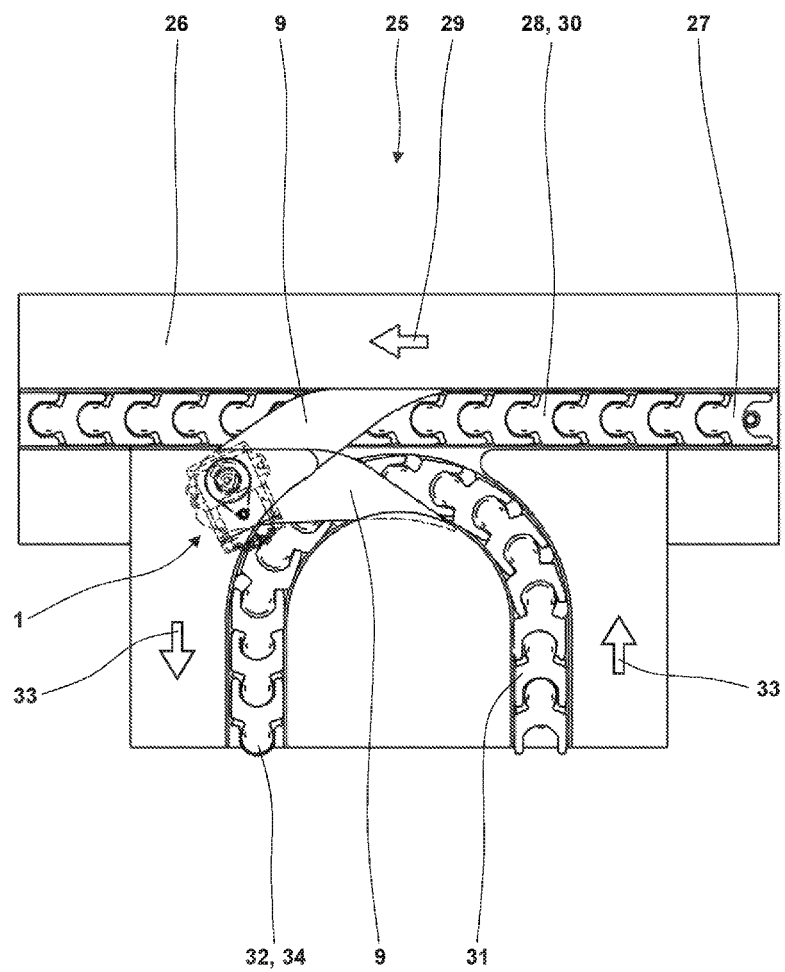
FIG. 7 illustrates a view from above of a profile rail of a conveying apparatus including the assembled turnout unit.

FIG. 7 illustrates a view of the turnout unit 1 in an exemplary mounted condition. The turnout unit 1 is mounted in a conveying apparatus 25. Due to the fact that the essential elements of the turnout unit 1 are arranged below the conveying apparatus 25, it is illustrated by a broken line.

The conveying apparatus 25 includes a profile rail 26. The profile rail 26 includes a first conveying portion 27 in which a first conveying means 28 is driven in the first conveying direction 29. In this example, the first conveying means 28 is a first conveying chain 30. However, it could also be a different suitable conveying means 28.

A second conveying portion 31 including a second conveying means 32 is arranged in the profile rail 26. The second conveying means 32 is moved in the second conveying direction 33 being different than the first conveying direction 29. In this case, the second conveying means 32 is also designed as a conveying chain 34. However, it could also be a different suitable second conveying means 32.

Object holders (not illustrated) on which the workpiece to be machined are fixed are placed on the first conveying chain 30. The object holders are frictionally supported on the first conveying chain 30, and they are moved by and together with the conveying chain 30 in the first conveying direction 29.

The turnout unit 1 now determines if the object holders remain in the first conveying portion 27 or are transferred into the second conveying portion 31. Both pivot positions of the turnout arm 9 are simultaneously illustrated in FIG. 7. However, it is to be understood that there only is one of these positions at a time. When the pivot arm 9 is located in its approximately 3 o'clock position, the turnout arm 9 does not protrude into the first conveying portion 27. The object holders thus remain in the region of the first conveying portion 27, and they are passed by the turnout unit 1.

When the turnout arm 9 is now rotated in the counter clockwise direction and is located approximately in the 1 to 2 o'clock position, the object holders arriving at the right hand side are transferred into the second conveying portion 31, and they are further conveyed in the conveying direction 33 (in a downward direction as seen in the illustration of FIG. 7).

Figure 8:
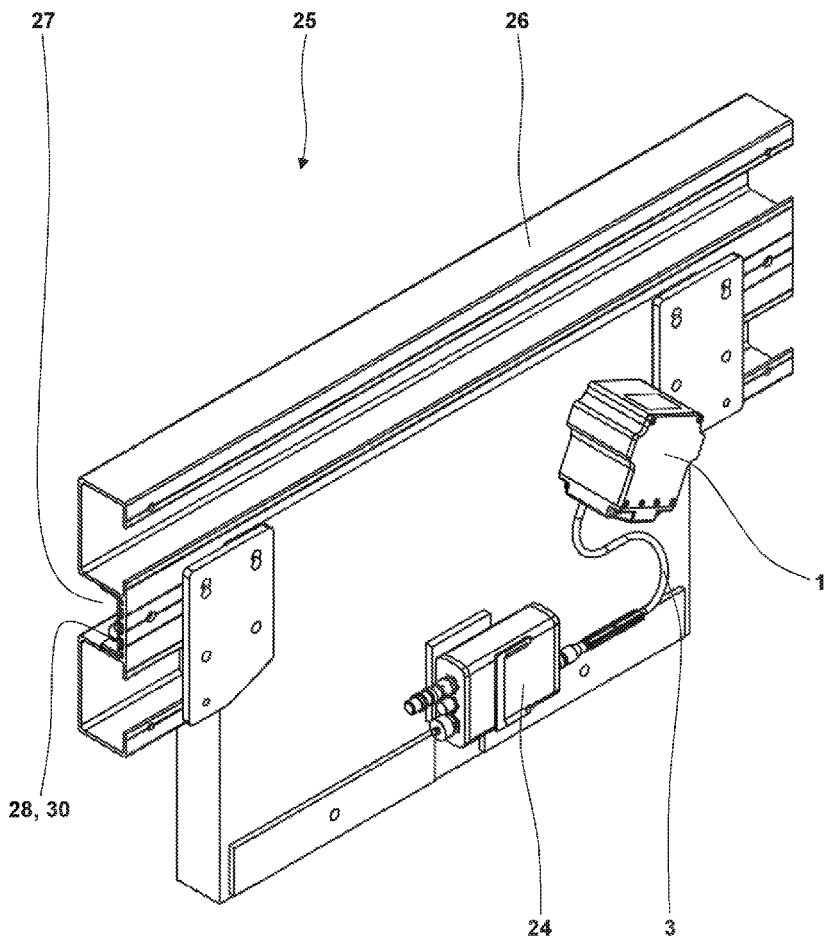
FIG. 8 illustrates a rear perspective view of the profile ail according to FIG. 7.

The rear of the conveying apparatus 22 is illustrated in FIG. 8 in a way that the arrangement of the turnout unit 1 and of the control unit 24 being connected thereto can be seen. It is demonstrated that substantial parts of the housing 2 and especially the housing base body 21 are arranged at the other side of the profile rail 26 than the conveying means 28, 32. The flange 8 protrudes through a bore in the profile rail 26 such that the turnout arm can be connected thereto and is located at the other side of the profile rail 26.

Figure 9:
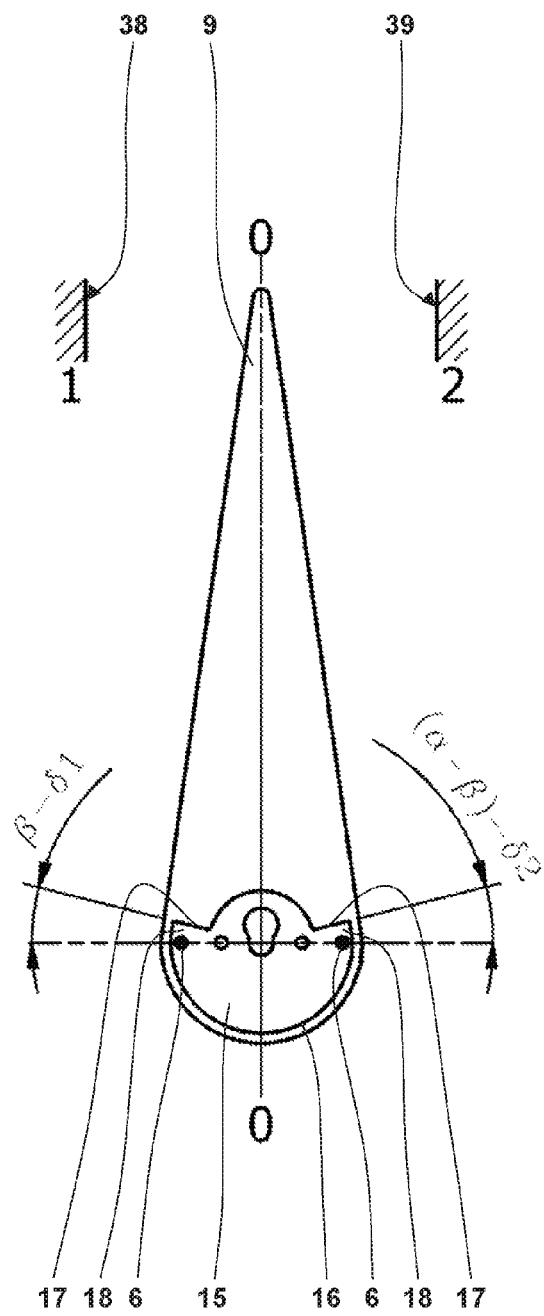
FIG. 9 illustrates a view of an exemplary embodiment of the new pivot angle definition element and of the turnout arm of the turnout unit in the zero position.
Figure 10:
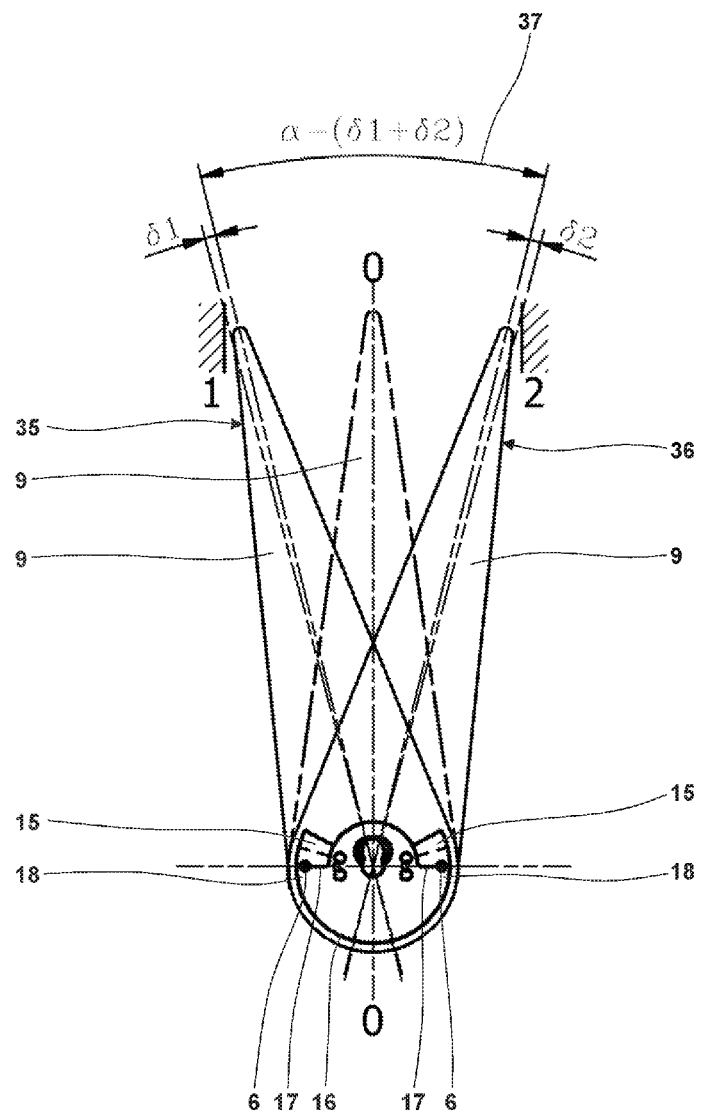
FIG. 10 illustrates the elements of the turnout unit according to FIG. 9 in the zero position as well as in the first pivot position and the second pivot position of the pivot angle definition element.
Figure 11:
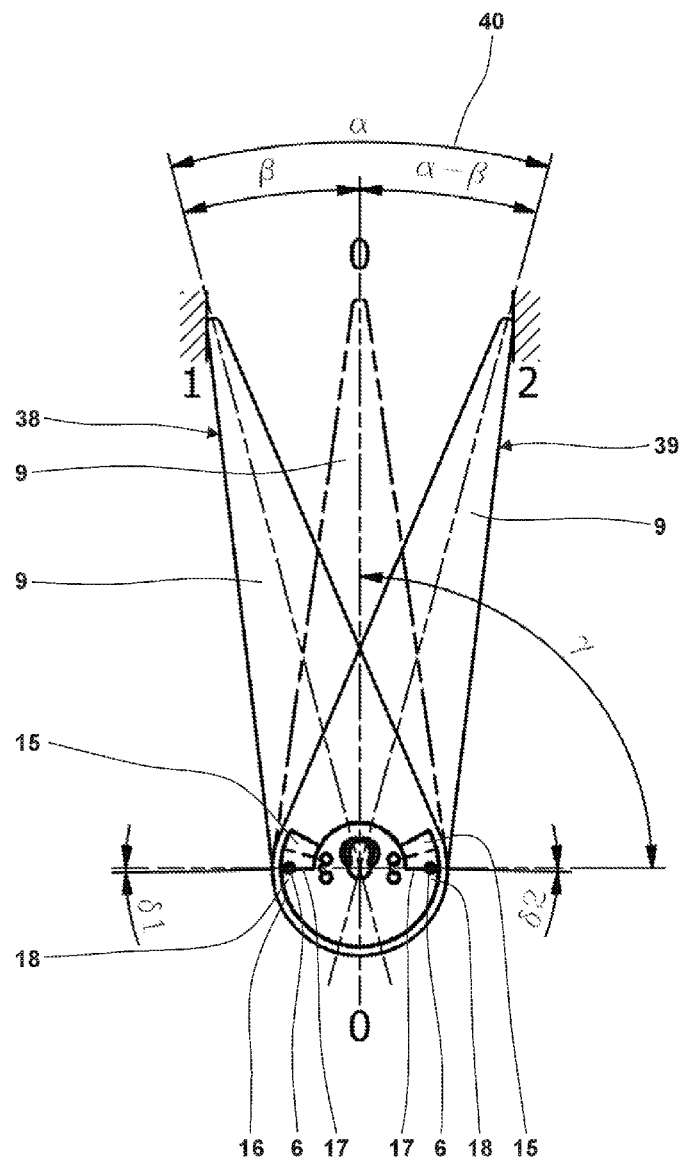
FIG. 11 illustrates the elements of the turnout unit according to FIG. 9 in the zero position as well as the third pivot position and the fourth pivot position of the turnout arm of the turnout unit.

FIGS. 9-11 illustrate an exemplary arrangement of an exemplary embodiment of the pivot angle definition element 15, the turnout arm 9 and the sensors 6 of the new turnout unit 1. The turnout arm 9 could also have a different shape, for example the shape as illustrated in FIG. 7.

In FIG. 9, the pivot angle definition element 15 and thus the turnout arm 9 being fixedly connected thereto to be commonly rotated therewith are illustrated in position 0—i.e. the center position. In addition, there are position 1 and position 2 being defined by the respective lateral limitation of the respective conveying portions 27, 31 of the profile rail 26. Correspondingly, position 1 and position 2 illustrated in FIG. 11 correspond to the third pivot position 38 and to the fourth pivot position 39 (or vice versa) of the turnout arm 9.

FIGS. 10 and 11 both illustrate three positions of the pivot angle definition element 15 and of the turnout arm 9 simultaneously. It is to be understood that these positions do not actually exist simultaneously. Due to this illustration, the lines overlap partially. In addition to position 0. FIG. 10 illustrates the first pivot position 35 and the second pivot position 36 of the pivot angle definition element 15. It is to be seen that these pivot positions 35, 36 do not correspond to position 1 and position 2, but that they differ therefrom by the angle δ1 and δ2, respectively. This means that the turnout arm 9 does not contact the lateral limitations of the respective conveying portion 27, 31.

When the pivot angle definition element 15 and thus also the turnout arm 9, starting from position 0, rotates in a counter clockwise direction towards position 1, the detection portion 18 of the pivot angle definition element 15 initially further protrudes into the detection portion of both sensors 6 such that a respective detection signal is emitted. In case the sensors 6 are light barriers, the light beam is interrupted and the respective sensor signal is not present, i.e. the contact is broken. In this case, only the left sensor 6 is responsible for terminating the pivot movement. The detection point 17 being illustrated in the left portion of FIG. 10 at the same height as the left sensor 6 exists the region of the sensor 6 such that there no longer is a positive detection signal. In case both sensors 6 are light barriers, this means that the light beam is no longer interrupted and the sensor signal is present. The respective signal is transmitted to the control unit 24 via the electric line 3. The control unit 24 then sends a stop signal to the electric motor 14 via the electric line 3. The same applies correspondingly to the second pivot position 36 being illustrated in the right portion of FIG. 10. In this case, the detection point 17 being illustrated in the right portion of the figure exits the region of the right sensor 6.

The same applies correspondingly to the third pivot position 38 and to the fourth pivot position 39 of the turnout arm 9 being illustrated in FIG. 11. In contrast to FIG. 10, position 1 and position 2 are taken. There is a greater second pivot angle difference 40.

These different pivot position 35, 36 and 38, 39, respectively, and the pivot angle differences 37, 40 having different values may be used for a special self-teaching method of the turnout unit 1. This teaching method is preferably conducted always after a power supply interruption or a restart of the system. The teaching method may include the following phases:

Phase 1

The turnout arm 9 is pivoted in the direction of the desired new turnout end position, namely position 1 or position 2. If it has been previously located in the normal corresponding other turnout end position, this movement especially occurs at a reduced velocity after the start, it is then accelerated and it is reduced shortly before reaching the final position. The positions at which the velocity is increased and decreased, respectively, may be chosen depending on the number of the taken steps of the stepped motor 14 and/or depending on the fact if detection points have been reached. The velocities, acceleration and deceleration may be calculated depending on the moment of inertia of the turnout arm 9, and they can be considered by the software of the control unit 24.

If, however, the movement begins at an undefined intermediate position, it occurs at a decreased velocity.

As soon as the respective detection portion 18 and the last detection point 17, respectively, exits the portion of the respective sensor 6, the sensor 6 sends the respective signal to the control unit 24. Thus, the first pivot position 35 and the second pivot position 36, respectively, illustrated in FIG. 10 has been taken. The movement may be—but does not have to be—interrupted.

Phase 2

The movement is now continued at a lower velocity over a defined period of time and a defined path, respectively. This path is calculated in a way that it is ensured that the turnout arm 9 reaches position 1 and position 2, respectively. For example, this path may be between approximately 5 and 10 mm, especially between approximately 7 to 8 mm.

Phase 3

The sense of rotation of the electric drive 14 is now inverted such that the turnout arm 9 is again pivoted in the opposite direction.

This occurs at a decreased velocity. The traveled path is determined. In case of a stepped motor, this is achieved by means of the number of steps.

This rearward movement is continued until the detection point 17 of the pivot angle definition element 15 reenters the region of the sensor 6. At this place, the determination of the path is concluded. The determined path is stored as the calibrating path in a storage medium of the electric control unit 24 or a suitable apparatus being connected thereto.

Phase 4

The turnout arm 9 is now pivoted at a decreased velocity in the desired direction until it has traveled through the calibrating path.

It is possible that it is programmed in a way that the stepped motor 14 takes some few additional steps to ensure that the turnout arm 9 has reached the desired position 1 and position 2, respectively.

In case the turnout arm 9 already reaches the mechanical end stop before this calibrating procedure has been concluded, the motor 14 may take a defined number of attempts to reach the controlled end position. After this, the control unit 24 stops the motor 14 and switches into an error mode. For example, this error mode may be indicated by an LED or a different optical and/or acoustical indicator at the control unit 24. In this case, the mechanical arrangement of the turnout arm 9 in the conveying apparatus 24 is checked.

Both end positions of the turnout arm 9 are retaught after a power supply interruption when first moving in the respective direction. The direction of the pivot movement is handed over to the stepped motor 14 by the control unit 24. The control unit 24 receives this command by the programmable logic controller (PLC), for example. The teaching of these end positions is concluded when both pivot directions have been controlled by respective signals and the calibrating process has been conducted as described above. However, it is also possible to only teach one end position and to determine the second end position by means of the taught first end position.

FIGS. 12-15 now illustrate different exemplary designs and arrangements of the pivot angle definition element 15 and of the one sensor 3 or of the plurality of sensors 3.

Figure 12:
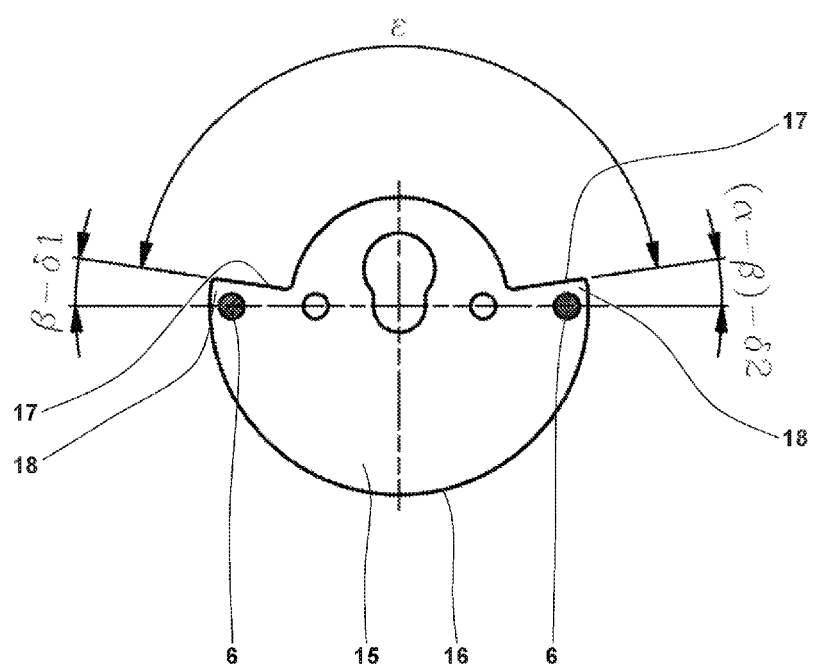
FIG. 12 illustrates a view of an exemplary embodiment of the new pivot angle definition element and two sensors being arranged to be displaced by 180°.

The embodiment illustrated in FIG. 12 corresponds to the embodiments illustrated in FIGS. 9-11 and being described above in detail such that it is referred to these statements.

Figure 13:
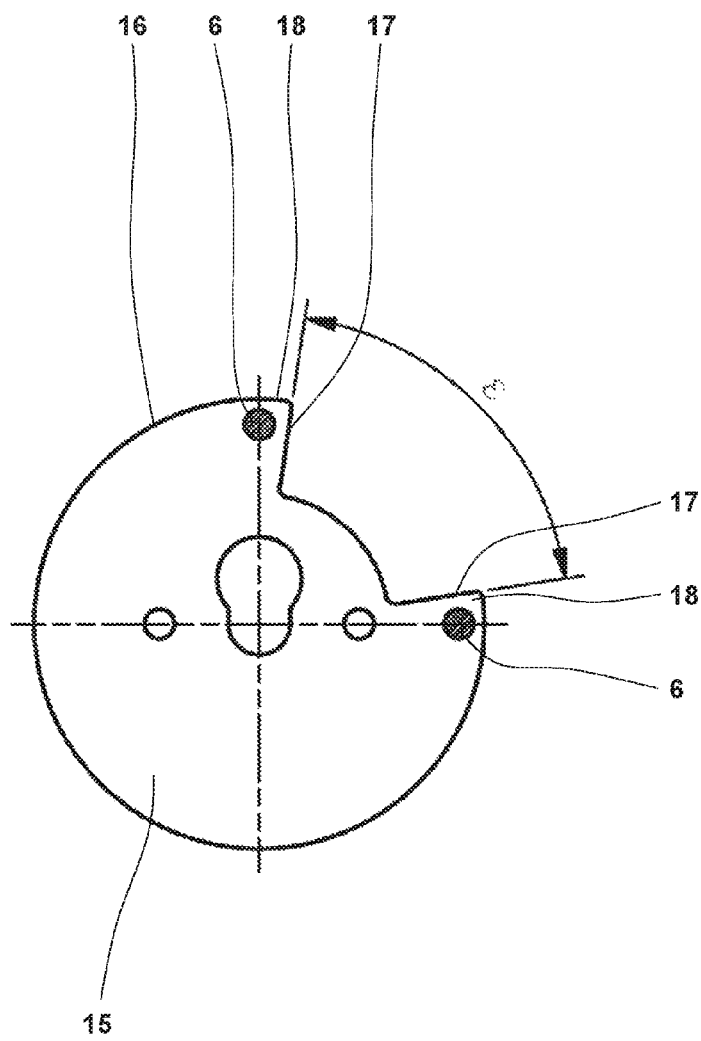
FIG. 13 illustrates a view of another exemplary embodiment of the new pivot angle definition element and two sensors being arranged to be displaced by 45°.

In contrast to FIG. 12, the embodiment illustrated in FIG. 13 includes sensors 6 not being arranged to be displaced by 180°, but instead by 45°. Correspondingly, the pivot angle definition element 15 has a different outer shape. The detection portions 18 being associated with the respective sensor 6 are also arranged to be displaced by approximately 45°. The pivot movement of the pivot angle definition element 15 ends at the respective detection point 17. This means that the pivot positions and the pivot angle difference can be changed by a change of the distance between the detection points 17 (in the direction of rotation). The first pivot angle difference 37 may be changeable in this way to adapt the turnout unit 1 to a different profile rail 26 by replacement of the pivot angle definition element 15. The two detection portions 18 each are located at an end of a partial circular arc 16 having a radius being increased compared to the non-detection portion. This partial circular arc 16 extends over more than 270°.

Figure 14:
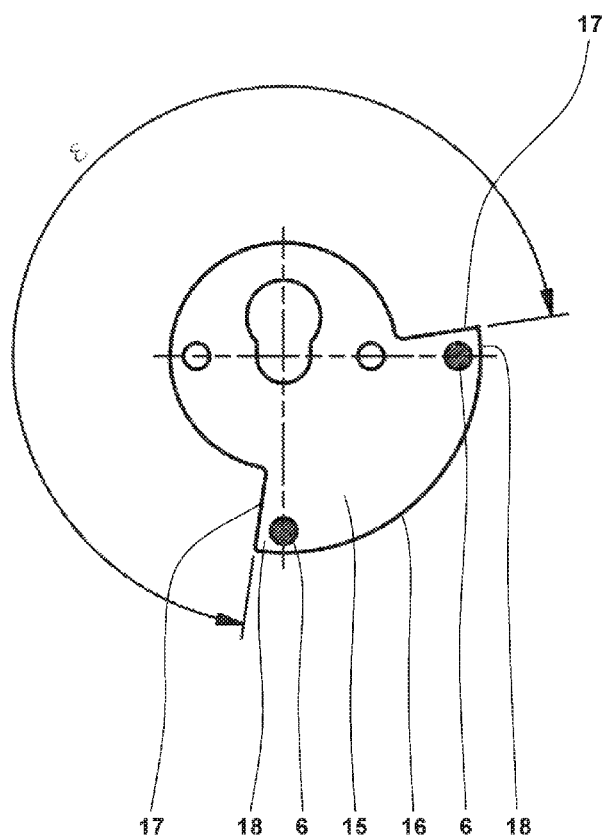
FIG. 14 illustrates a view of another exemplary embodiment of the new pivot angle definition element and two sensors being arranged to be displaced by 45°.

In the exemplary embodiment illustrated in FIG. 14, the sensors 6 are also arranged to be displaced by 45°. The two detection portions 18 are each located at an end of a partial circular arc 16 having a radius being increased compared to the non-detection portion. This partial circular arc 16 extends over more than 90°.

Figure 15:
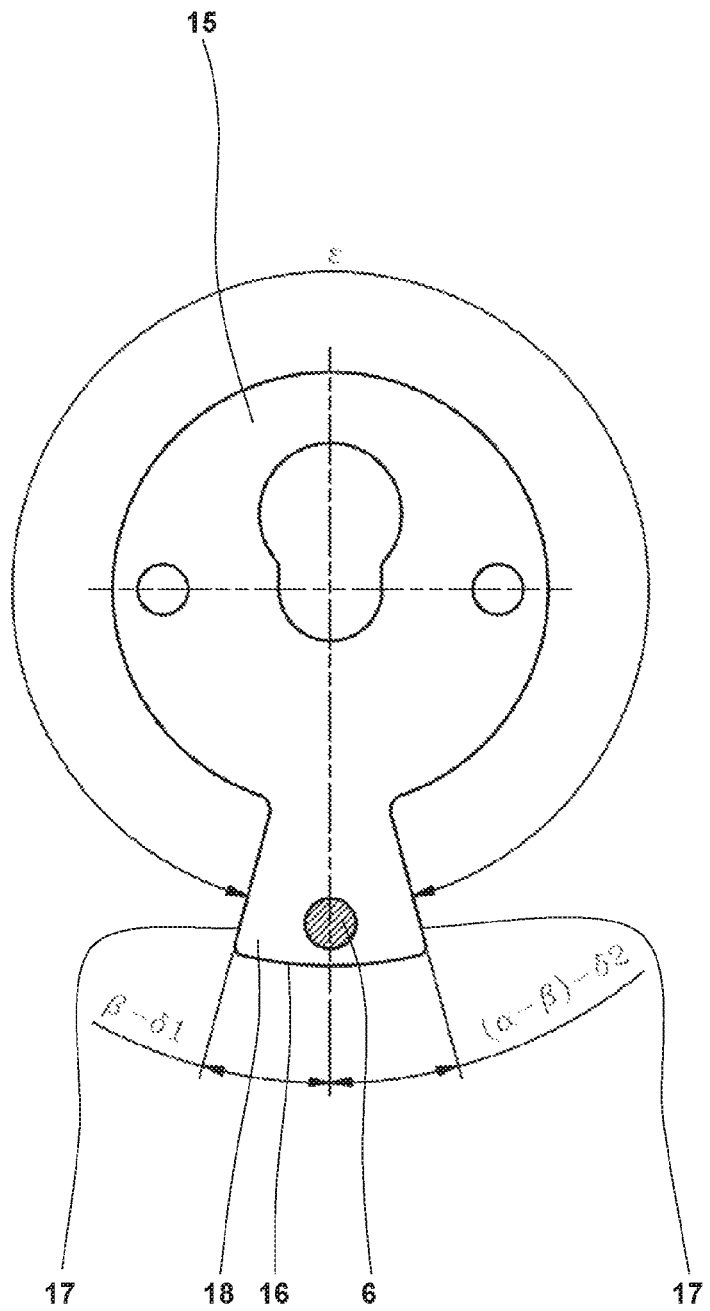
FIG. 15 illustrates a view of another exemplary embodiment of the new pivot angle definition element and only one sensor.

Finally, FIG. 15 illustrates an embodiment of the pivot angle definition element 15 in which the pivot angle definition element 15 only cooperates with one sensor 6. Correspondingly, there only is one continuous detection portion 18 being limited in the sense of rotation of the pivot angle definition element 15 by the two detection points 17. Thus, the length of the continuous detection portion 18 corresponds to the value of the first pivot angle difference 37.

Many variations and modifications may be made to the preferred embodiments of the invention without departing substantially from the spirit and principles of the invention. All such modifications and variations are intended to be included herein within the scope of the present invention, as defined by the following claims.

We claim:

1. An electric turnout unit for determining and changing a conveying path of object holders being moved by and together with a conveying apparatus, comprising:
   a shaft,
   a pivot angle definition element,
      the pivot angle definition element being rotatably supported,
      the shaft being fixedly connected to the pivot angle definition element to be commonly rotated therewith,
      the shaft is fixedly connected to a turnout arm to be commonly rotated therewith, said turnout arm being a component of the turnout unit which protrudes into a conveying path and which defines the conveying path for the object holders,
      the pivot angle definition element having a first pivot position and a second pivot position, the first pivot position and the second pivot position differing by a first pivot angle difference being greater than zero,
      the pivot angle definition element including a first detection point being associated with the first pivot position and a second detection point being associated with the second pivot position; and
   one or more sensors for determining the first pivot position and the second pivot position of the pivot angle definition element,
   wherein the shaft has a third pivot position being associated with a first conveying path of the object holders and a fourth pivot position being associated with a second conveying path of the object holders, the third pivot position and the fourth pivot position differing by a second pivot angle difference being greater than zero,
   wherein the second pivot angle difference is greater than the first pivot angle difference.

2. The electric turnout unit of claim 1, wherein
   the first pivot position of the pivot angle definition element is associated with the third pivot position of the shaft; and
   the second pivot position of the pivot angle definition element is associated with the fourth pivot position of the shaft.

3. The electric turnout unit of claim 1, wherein the pivot angle definition element has an outer shape, the first pivot angle difference being defined by the outer shape of the pivot angle definition element.

4. The electric turnout unit of claim 1, wherein the first detection point and the second detection point of the pivot angle definition element are endpoints of a common partial circular arc.

5. The electric turnout unit of claim 4, wherein the partial circular arc has a length and the first pivot angle difference has a value, the length of the partial circular arc defining the value of the first pivot angle difference.

6. The electric turnout unit of claim 1, wherein the electric turnout unit only includes one sensor being designed and arranged to detect the first detection point and the second detection point.

7. The electric turnout unit of claim 1, wherein the electric turnout unit includes exactly two sensors, namely a first sensor and a second sensor, the first sensor being designed and arranged to detect the first detection point and the second sensor being designed and arranged to detect the second detection point.

8. The electric turnout unit of claim 1, wherein the one or more sensors are designed as light barriers, photoelectric sensors or inductive sensors.

9. The electric turnout unit of claim 1, wherein the one or more sensors are designed as sensors including a break contact.

10. The electric turnout unit of claim 1, wherein the pivot angle definition element has an outer shape and is designed to be replaceable by a different pivot angle definition element having a different outer shape resulting in a different first pivot angle difference.

11. The electric turnout unit of claim 1, further comprising a housing, the one or more sensors being arranged in the housing.

12. The electric turnout unit of claim 1, further comprising an electric stepper motor, the electric stepper motor being designed and arranged to produce the pivot movement of the shaft and of the pivot angle definition element, the stepper motor being designed and controlled to be switched off depending on sensor signals of the one or more sensors.

13. A method of teaching an electric turnout unit for a conveying apparatus for conveying object holders, comprising the steps of:
   pivoting a turnout arm of the turnout unit in a direction of a desired turnout end position by an electric drive,
   detecting that a pivot angle definition element of the turnout unit has reached a defined pivot position by a sensor under emission of a signal to a control unit,
   continued pivoting of the turnout arm in the direction of the desired turnout end position for a defined period of time or a defined path,
   pivoting the turnout arm in the opposite direction until the pivot position of the pivot angle definition element has been reached again, while during this a traveled path is determined and stored as a calibrating path.

* * * * *